United States Patent [19]
Fort et al.

[11] Patent Number: 5,788,008
[45] Date of Patent: Aug. 4, 1998

[54] ACTUATOR FOR 4-WHEEL DRIVE VEHICLE

[75] Inventors: William H. Fort, Stratham, N.H.; Carl Frank, Sharon, Mass.

[73] Assignee: Joseph Pollak Corporation, Boston, Mass.

[21] Appl. No.: 679,298

[22] Filed: Jul. 12, 1996

[51] Int. Cl.$^6$ ............................................. F16D 28/00
[52] U.S. Cl. ............................................. 180/247; 192/84.6
[58] Field of Search ............................................. 180/233, 247, 180/248, 249; 192/82 R, 84.1, 84.6

[56] References Cited

U.S. PATENT DOCUMENTS 5,267,635  12/1993  Peterson et al. ............... 192/84.6 X
5,605,213  2/1997  White .............................. 192/82 R

*Primary Examiner*—Kevin Hurley

[57] ABSTRACT

A system for selecting either 2-wheel or 4-wheel drive in a vehicle which includes an actuator mounted on the differential housing of the vehicle drive system for engaging and disengaging the externally splined ends of opposing shafts in response to a signal switched from a power source in the vehicle cab. The actuator converts the rotary output of a DC motor to linear output of a carrier-mounted lead screw and drive nut which is transferred to a plunger which moves an internally splined ring between the opposing splined shaft ends. The position of the splined ring and the disposition of the drive in either 2-wheel or 4-wheel operation is signalled by a planetary gear system in which one ring gear is fixed and a second switch ring gear is rotatable, the two ring gears having different numbers of teeth whereby a single revolution of the lead screw and its carrier causes less than one revolution of the switch ring gear over the total linear motion of the drive nut and plunger, which is detected and controlled by means of wiping members in electrical contact with conducting strips on the carrier which are in circuit with the power source in the vehicle cab.

8 Claims, 4 Drawing Sheets

ACTUATOR FOR 4-WHEEL DRIVE VEHICLE

This invention relates in general to 4-wheel drive vehicles and in particular to an actuator for the remote shifting between 2-wheel and 4-wheel drive in such vehicles.

BACKGROUND OF THE INVENTION

The value of 4-wheel drive in utility and commercial vehicles has long been recognized. It is commonplace for 4-wheel drive to be utilized in heavy-duty construction, transport, military and other operations, especially in rough terrain or in snow, mud or sand. In more recent years, a market has developed for 4-wheel drive operation of sport vehicles and even passenger vehicles for winter driving. For reasons of original cost, expense of operation, and general inconvenience associated with full-time 4-wheel drive, it has proven desirable to have systems in which the operator has the option of selecting 2 or 4-wheel drive depending on the conditions at any given time. To do so, vehicles having both front and rear-wheel drive systems have been offered. Normally, only the rear wheels would be the driving wheels, and when it was desired to operate under 4-wheel drive, it was necessary for the driver to leave the vehicle and manually lock the hubs of the front wheels in order that 4-wheel drive could be engaged. This inconvenient and relatively crude expedient tended to limit the acceptance of such vehicles in the lighter vehicle market, and some efforts have been made to provide systems in which 4-wheel drive can be invoked by the driver without his having to leave the cab of the vehicle. These newer remotely operated systems have achieved some success but, for the most part, they have been costly and/or somewhat unreliable. The present invention has as its primary object the provision of an inexpensive, highly reliable actuator for 4-wheel drive vehicles.

SUMMARY OF THE INVENTION

The present invention is organized about a linear actuator mounted on the differential housing and controlled in its operation by an electrical signal sent from a switch in the cab of a vehicle. The output of the actuator is linear motion of a plunger which pushes a fork within the housing which in turn slides a splined ring that is fully engaged on one splined shaft until it also engages an opposing splined shaft. When the switch is thrown to retract the actuator, a return spring pushes the fork back and the splined ring disengages from the opposing shaft. Because they are within the differential housing, the fork, ring, and the output plunger are actually submerged in gear oil. The remainder of the actuator assembly, including electrical signal and power components, are outside the differential housing and isolated from the gear oil by an 0-ring seal.

Basic motion is generated in the actuator by the rotary output of a relatively small reversible DC motor which is converted to a linear output by way of a lead screw and drive nut. Torque on the lead screw is magnified by means of a planetary gear reduction set and the linear output is transferred to the output plunger through a spring disposed between the drive nut and the plunger. This allows for "cocking" of the actuator if the differential splines are misaligned. The splined ring is urged against the end of the opposing shaft by the spring and then will pop into position, engaging both opposed shafts upon any slight movement of the splines. A printed circuit board which is contacted by suitable wipers is also mounted in the actuator outside the differential housing, and it controls operation of the drive motor and the generation of a feedback signal to a lamp in the cab indicating engagement and disengagement of the 4-wheel drive.

For a better understanding of the present invention, together with other and further objects, features, and advantages, reference should be made to the following description of a preferred embodiment which should be read with reference to the appended drawing in which:

DESCRIPTION OF PREFERRED EMBODIMENT

Figure 1:
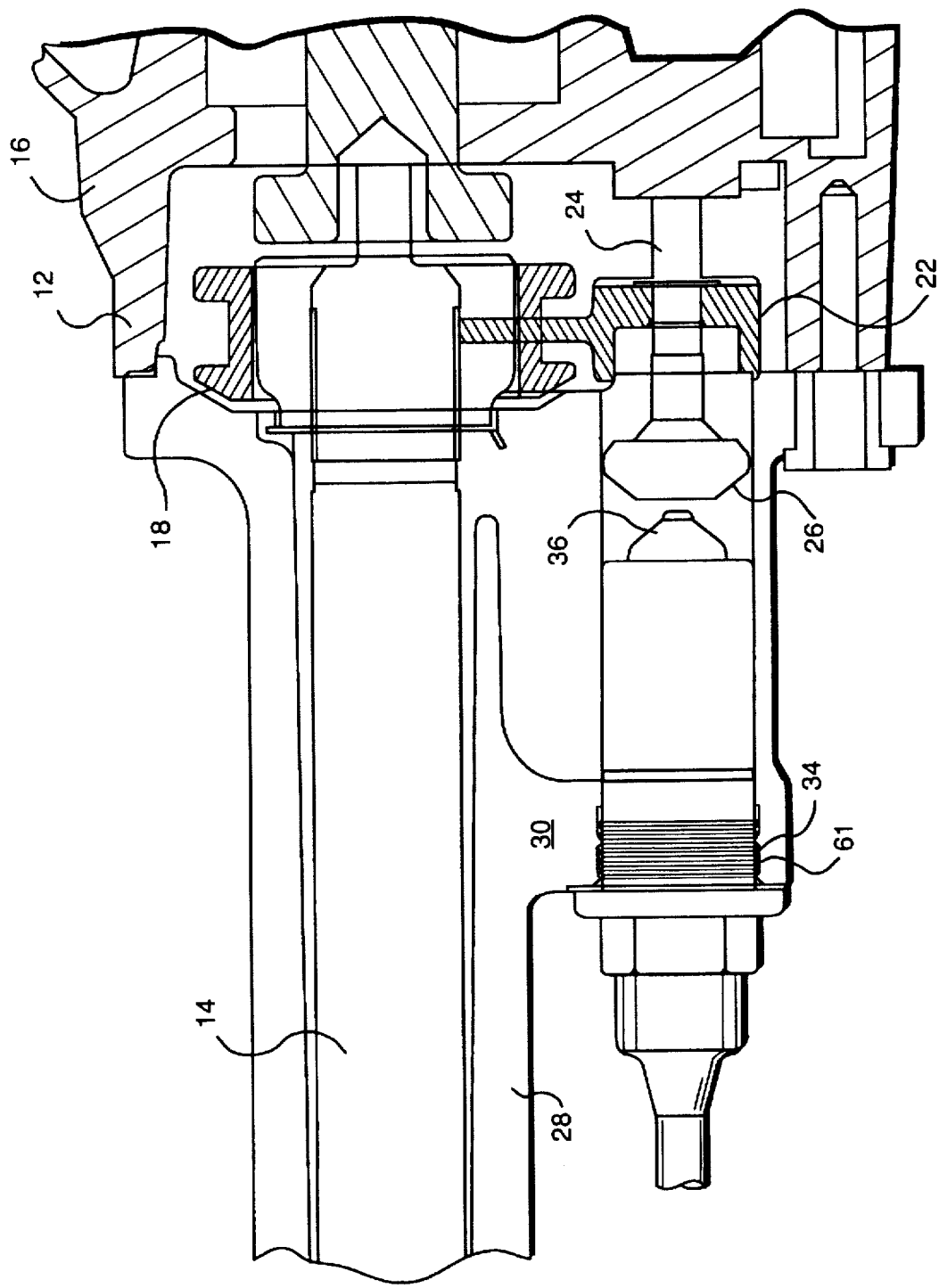
FIG. 1 is a view partly in section of a portion of the front differential of a 4-wheel drive vehicle having an actuator mounted on the differential housing.

In FIG. 1, there may be seen in part a front differential housing 12 typical of those utilized in 4-wheel drive vehicles. Extending out from the housing to the left is a wheel output shaft 14 and extending outward through the housing to the right is a differential output shaft 16. When the vehicle is proceeding normally with 2-wheel drive in operation, only the rear wheels are driving the vehicle and the front differential will be set up as it appears in FIG. 1. That is, there will be no direct connection between the differential output shaft 16 and the wheel output shaft 14.

In that circumstance, an internally splined ring 18 is engaged on the externally splined end of the wheel output shaft 14. The axial position of the splined ring 18 on the wheel output shaft 14 is controlled by a fork 22. The fork 22 is mounted on a reciprocating shaft 24 having an end knob 26, and is normally urged in a leftward direction by a spring. The wheel output shaft 14 is surrounded by an enclosure 28 having a radial extension 30. The extension 30 has an opening formed through its wall which is threaded to receive matching threads of the body of an actuator 34. The actuator 34 has a plunger 36 which is axially reciprocable in the actuator body. The plunger 36 contacts the knob 26 and in its forward motion out of the actuator body, pushes the knob and its support shaft 24 from left to right as seen in the drawing. As the shaft 24 moves to the right, it carries the fork 22 with it against spring pressure, and the splined ring is moved about one inch from left to right to engage the splines on the exterior of the differential output shaft if they are aligned with the splines of the ring 18. If, on the other hand, the two sets of splines are misaligned, the plunger 36 is urged against the knob 26 by the action of a compression spring in the actuator, not seen in this view. The pressure of the actuator spring is applied to the splined ring through the fork 22 and as soon as there is any relative movement between the gear controlling the position of the wheel output shaft 14 and the differential output shaft 16 the splined ring will pop into position on the end of the differential output shaft, then engaging both the wheel output shaft and differential output shaft.

Figure 2:
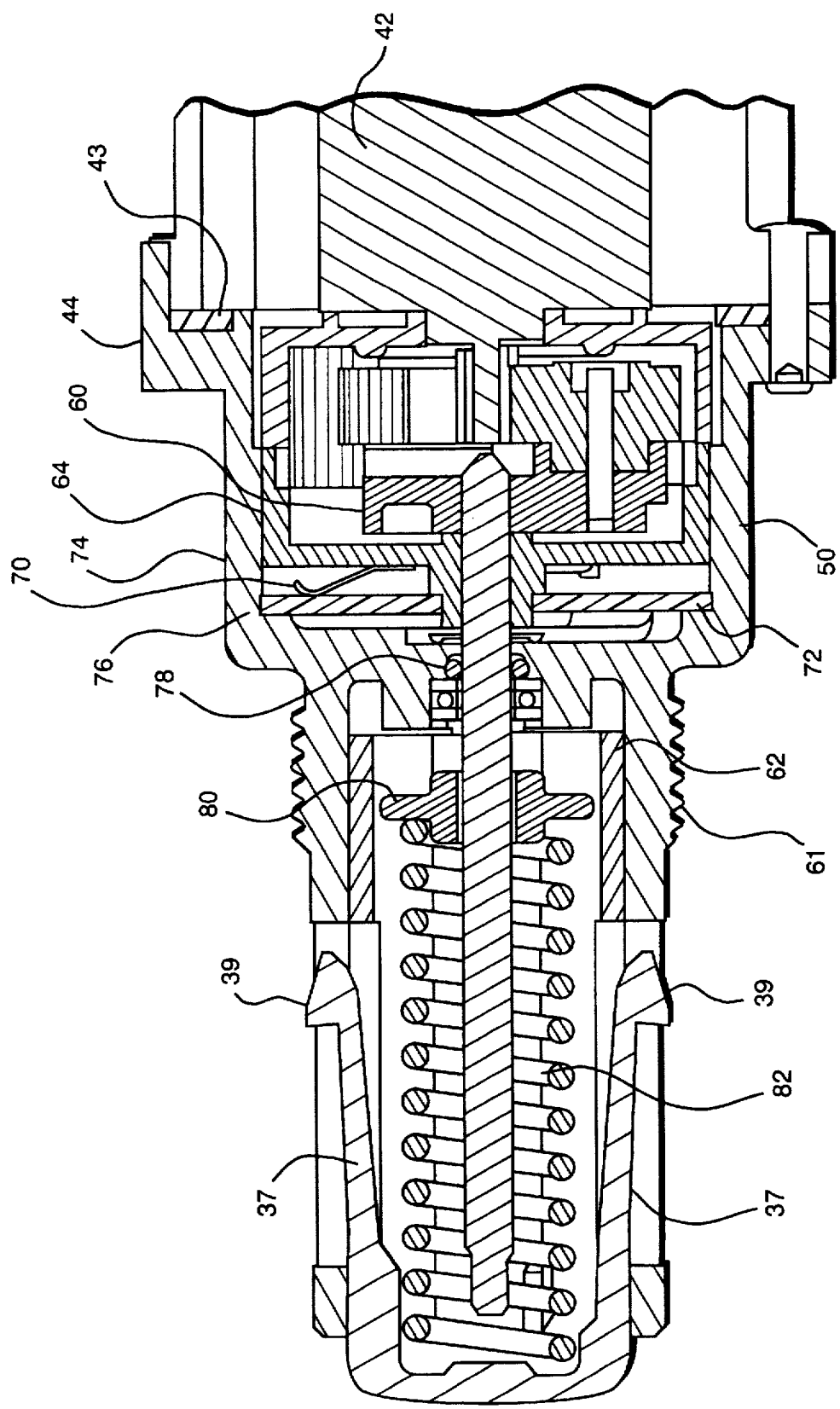
FIG. 2 is a sectional view of the linear actuator of FIG. 1.
Figure 3:
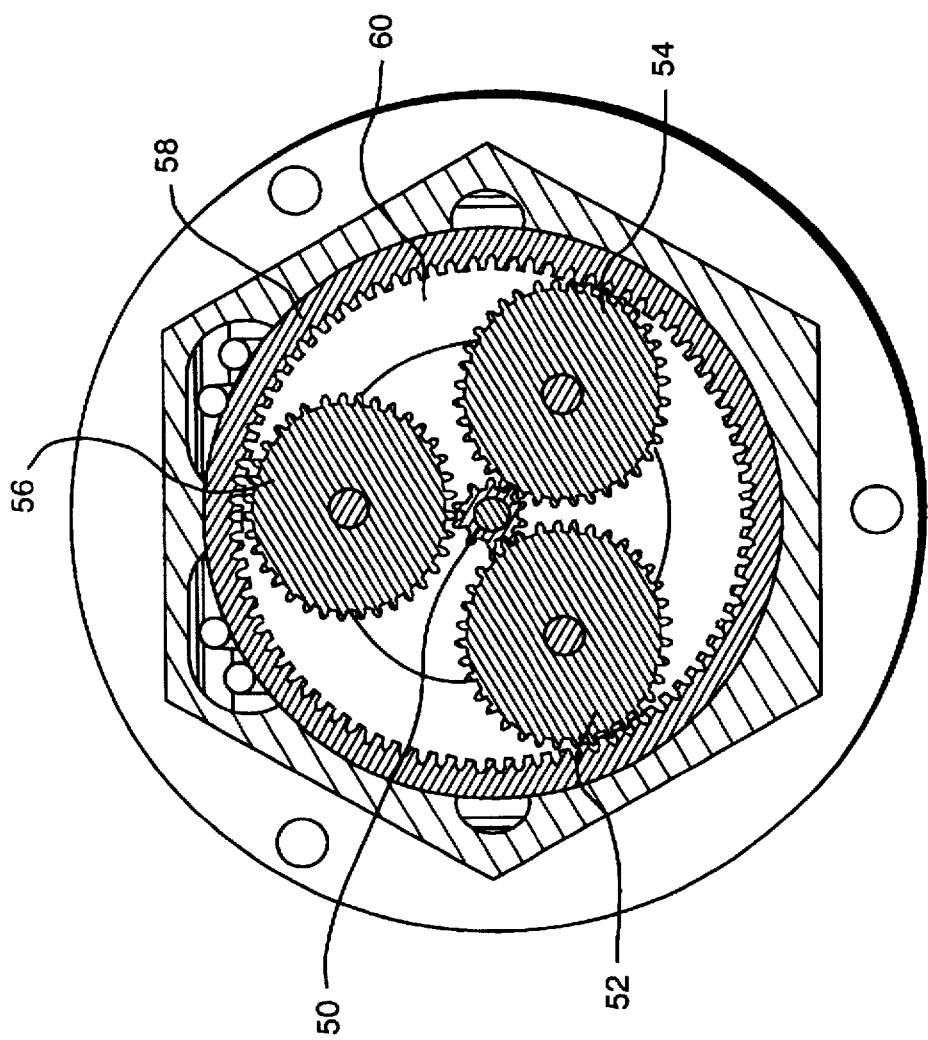
FIG. 3 is a cross-sectional view taken along the line 3—3 of FIG. 2.

In the sectional view of FIG. 2, detail of the actuator may be seen. Basic drive for the device is provided by a motor 42 which may be a permanent magnet DC motor. The motor 42 is fitted into a housing which is riveted to the end of an actuator body 44, a suitable gasket 43 being provided between the two items. Fixed to, or forming a part of the motor housing is a power ring gear 58. The output shaft of the motor 42 extends through the center of the power ring gear 58 and rotates a sun gear 50 of a planetary group mounted for rotation on a carrier 60 as shown in FIG. 3. Surrounding the sun gear 50 are planet gears 52, 54 and 56. It will be noted that the sun gear 50 meshes with all three planet gears, which in turn mesh with the ring gear 58, which is the power ring gear of the device.

A lead screw 62 is fixed in the center of the carrier 60. Surrounding the carrier is an internally toothed switch gear 64 similar in most respects to the power ring gear 46. The switch gear 64 meshes with only one of the planet gears, namely, the gear 52, which is extended axially relative to the planet gears 54 and 56 by an amount sufficient for it to mesh with the switch gear 64.

On the bottom of the switch gear 64, there are mounted two sets of wiper contacts. Each set consists of three contacts joined at their base, the wiper contact 70 being typical. The individual contacts of each set bear upon and bridge electrically three concentric conductive surface rings of a printed circuit board 72, forming a slide switch the operation of which is explained in greater detail hereinbelow. The printed circuit board is preferably in the form of a disk of about the same diameter as, and fixed in juxtaposition to, the switch gear 64.

The actuator body 44 has a first stepped-down section 74 within which the components described immediately above are contained. A further step reduces the body to the diameter on which the threaded section 61 is formed. The lead screw 62, which is fixed in the carrier 60, extends through an end wall 76 which separates the oil-filled section of the distributor housing from the outer section. An O-ring 78 is provided to maintain an isolating seal between the two volumes. Threaded on the lead screw 62 is a drive nut 80. A compression spring 82 bears upon the drive nut 80 and upon the interior of the plunger 36. The plunger 36 may be provided with guides 37 which reciprocate in slots 38 in the body of the actuator to maintain the orientation of the plunger 36 constant. The guides 37 have hooks 39 which limit the travel of the plunger by contacting the ends of their slots.

When the operator of the vehicle invokes the actuator, which may be effected by means of a single pole-double throw switch mounted in the cab, the shaft of the motor 42 rotates at a relatively high speed of about 11,000 rpm at its peak. Torque of the motor shaft is amplified by the planetary gear reduction set composed of the power ring gear 58, the planet gears 52, 54 and 56, and the carrier 60. The lead screw 32 fixed in the carrier rotates in the drive nut 80, which moves linearly to transfer motion to the plunger 36 through the spring 82. When the linear movement is complete, a feedback signal is sent to the operator to indicate engagement of the 4-wheel drive. This latter function is provided by utilizing a second ring gear, namely, the switch gear 64. The switch gear 64 is rotatable and has 84 teeth, while the power ring gear is fixed and has 83 teeth. Thus, during one full revolution of the carrier and lead screw, the switch ring gear rotates 1/84 of a revolution. Therefore, the switch ring gear rotates less than a revolution over the total linear movement of the drive nut and plunger, which is about one inch. This permits the use of simple wiping contacts and a printed circuit disk 72 as described or a cam-activated switch on the sealed side of the O-ring to sense the position of the splined ring. In one arrangement, voltage to energize a signal lamp in the cab of the vehicle is switched from the inner conductive ring to the outer ring of the printed circuit disk 72 as the switch ring gear 64 completes its travel, the vehicle then being in 4-wheel drive.

Figure 4:
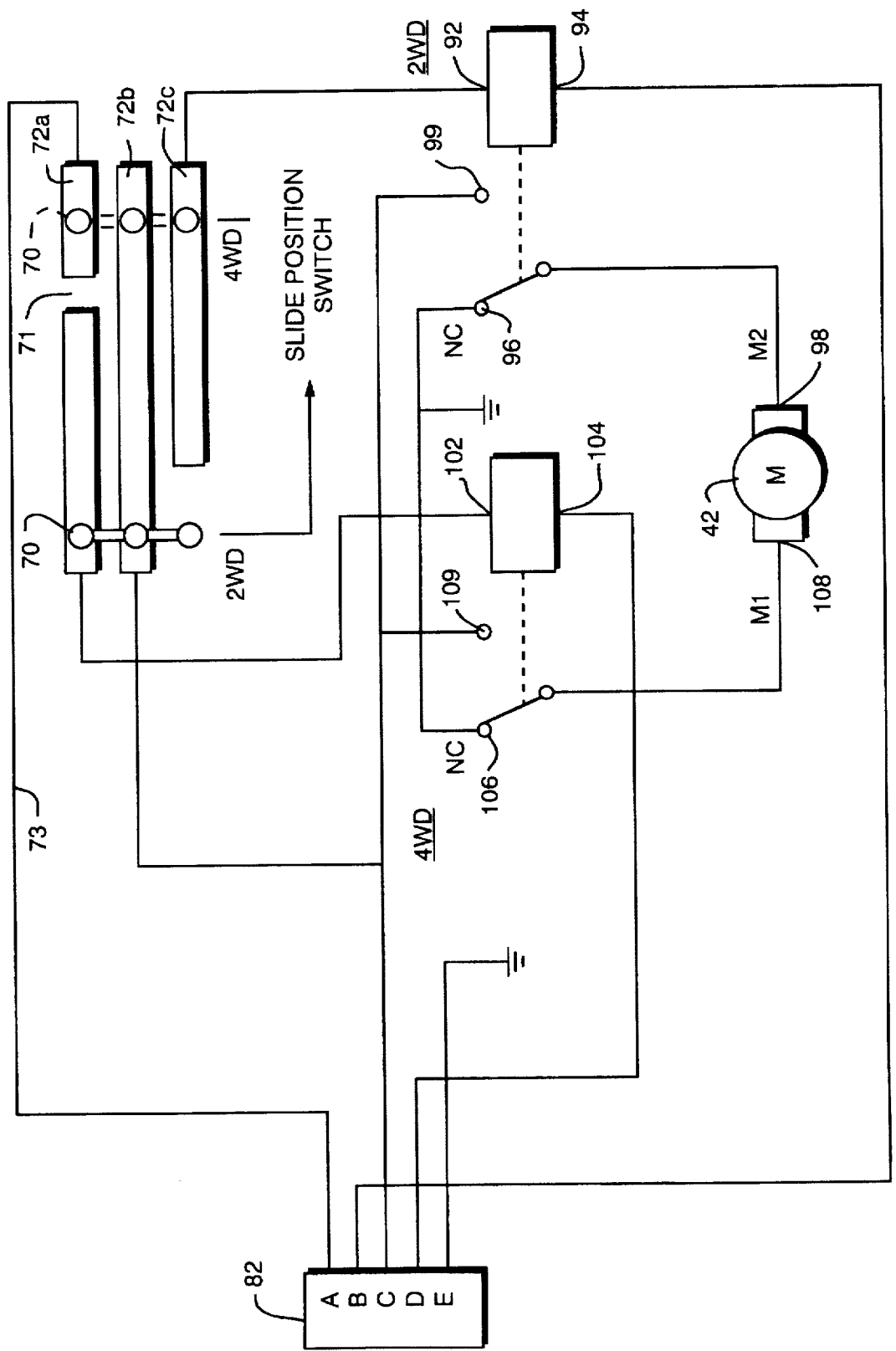
FIG. 4 is a schematic circuit diagram of the electrical controls of the system.

FIG. 4 is a schematic diagram of the electronics of the system. At the left of the diagram, there may be seen a connector block 82 having five terminals. Terminal A provides an electrical connection for a 4-wheel drive indicator such as a signal lamp mounted in the cab of the vehicle. Terminal B provides a connection to one side of a single pole-double throw switch to actuate 2-wheel drive as explained below. Terminal C provides electrical connection to a voltage source such as the 12-volt battery of the vehicle. Terminal D provides a connection to the other side of the single pole-double throw switch to actuate 4-wheel drive as explained below. Terminal E provides a ground connection, preferably to the vehicle chassis.

In FIG. 4, the concentric conductive strips of the printed circuit board 72 are shown as parallel conductive surfaces 72a, 72b, and 72c. The topmost strip 72a represents the outer conductive ring; the middle conductive strip 72b represents the inner conductive ring; and the third lowermost conductive strip 72c represents the middle ring. The triple wiper contact 70 on the switch ring gear 64 is represented in full lines at the left and in phantom dotted lines adjacent the right-hand end of the strips.

The outer conductive ring 72a has a gap at a point about three-quarters of the way around its circumference as indicated by the reference numeral 71 on the schematic of FIG. 4. The gap 71 divides the strip into a long and a short portion. The short portion is connected by a line 73 to terminal A of the block 82 for actuating the warning light.

The conductive ring 72b runs the full circumference of the circuit board 72 and accordingly is represented as a full-length unbroken strip in the schematic. it is connected directly to the voltage bus and terminal C, which carries the battery voltage. The middle conductive ring on the printed circuit disc is represented by the strip 72C in the schematic and it extends for about the last three-quarters of the circuit disc.

The strip 72C is directly connected to one side 92 of a 2-wheel drive relay coil, the other side 94 of which is connected to terminal B of the connector block 82. The 2-wheel drive relay has a normally closed contact 96 through which it maintains a terminal 98 of the motor 42 at ground potential when no current flows in the relay coil. The normally open relay contact 99 is connected directly to the voltage bus and to terminal C of the connector block 82.

The large portion of the conductive strip 72a is connected to one side 102 of the 4-wheel drive relay coil, the other side 104 of the relay coil being connected directly to terminal D of the connector block 82. A normally closed contact 106 of the relay maintains a terminal 108 of the motor 42 at ground potential when no current flows through the coil.

In conventional 2-wheel drive operation, the slider switch 70 is disposed as shown in full lines in the schematic. To go into 4-wheel drive, the switch in the vehicle cab is thrown to ground terminal D. This establishes a circuit from the voltage source terminal C through the strip 72b, the slide switch 70, the strip 72a and the 4-wheel drive relay coil. The relay opens connecting the normally open contact 109 to the motor terminal 108. The voltage thus applied to the motor causes the slide 70 to move from left to right as seen in the diagram.

The motion of the sliding switch continues until it reaches the end of the larger portion of the strip 72a. As it enters the gap 71, current flow to the 4-wheel drive terminal 102 is lost, there no longer being a connection between the strip 72 and the strip 72b. The loss of current through the 4-wheel drive relay coil causes the relay to revert to its normally closed position at which the contact 106, grounds the motor terminal 108. Even though power is lost, the sliding switch coasts to the position shown in phantom, which is the 4-wheel drive position of the sliding switch and feedback voltage for a warning signal is applied from the strip 72b through the smaller strip portion 72a and the line 73 to the warning light terminal A of the connector block 82.

The system remains in the 4-wheel drive mode until reuse operation of the switch in the cab grounds terminal B. When terminal B is grounded, a circuit is established from the strip 72b through the strip 72c, the 2-wheel drive relay coil and back to terminal B of the connector block 82. This energizes the relay coil of the 2-wheel drive system, causing the relay to connect the normally open contact 99 to the drive motor terminal 98, causing the motor to rotate in a reverse direction, moving the slide switch from right to left. The motion continues until the slide passes beyond the left-hand end of the strip 72c and coasts to the position shown in full lines at the left.

The terminals B and D are connected in circuit with the single pole-double throw switch so that one or the other of the terminals, but never both, is grounded at all times.

Although what has been described is a preferred embodiment of the present invention, it is for purposes of explanation and should not be construed as limiting the invention to the details disclosed. The invention should be limited only by the spirit and scope of the appended claims.

What is claimed is:

1. Apparatus for shifting between 2-wheel and 4-wheel drive in a vehicle by means remotely engaging and disengaging the differential output shaft with the wheel output shaft in the differential drive system of said vehicle, said differential output shaft and said wheel output shaft having similar externally splined outer ends, comprising an internally splined ring normally fully engaging said wheel output shaft and axially moveable thereon, a fork for moving said splined ring axially into engagement with the splined outer end of said differential output shaft, an actuator mounted on the housing of said differential drive system and having a plunger for moving said fork a predetermined linear distance to cause said splined ring to engage and disengage said differential output shaft while maintaining engagement with said wheel output shaft, a lead screw, a drive nut threaded on said lead screw, a compression spring disposed between said drive nut and said plunger, a reversible motor and a reduction gear train driven by said motor, said gear train being connected to said lead screw, said motor rotating at relatively high speed and low torque and said lead screw rotating at relatively high torque and low speed by virtue of said reduction gear connection, and means disposed in said vehicle for energizing said motor whereby said plunger is moved linearly causing said fork to move said splined ring axially between said differential output shaft and said wheel output shaft.

2. Apparatus as defined in claim 1, wherein said reduction gear train includes a carrier and a planetary gear system, said planetary gear system including planet gears mounted for rotation upon said carrier, said lead screw being centrally fixed in said carrier, said motor having a housing and an output shaft rotating at relatively high speed, said planetary gear system further including a sun gear fixed to said motor output shaft, an internally toothed power ring gear fixed to said housing and meshing with said planet gears, and an internally toothed switch ring gear surrounding said carrier and meshing with one of said planet gears, whereby said carrier and lead screw rotate at relatively low speed, causing linear movement of said plunger and said splined ring.

3. Apparatus as defined in claim 2 and further including a printed circuit disk fixed in position in said actuator and having concentric conductive paths on a surface thereof, said conductive paths forming portions of electric circuits of said means for energizing said motor and for signaling the position of said splined ring relative to said differential output shaft, and wiper contacts fixed to said switch ring gear and contacting said conductive paths to control said energizing of said motor and said signaling of the position of said splined ring in accordance with the rotary position of said switch gear ring.

4. Apparatus as defined in claim 3 wherein said switch ring gear and said power ring gear have unequal numbers of teeth, a single revolution of said carrier and lead screw causing only a fraction of a revolution of said switch ring gear, said switch ring gear rotating less than a full revolution during motion of said drive nut and plunger over the total range of linear distance.

5. Apparatus as defined in claim 4 wherein said fixed power ring gear has 83 teeth and said rotatable switch ring gear has 84 teeth whereby said total range of linear distance of travel of said drive nut and plunger is about one inch.

6. Apparatus as in claim 5 wherein said concentric conductive paths formed on said printed circuit disk are three in number, including one path to provide voltage at all times to one of said wiper contacts, a second path to provide voltage to operate said motor in forward or reverse direction and a third path to provide signal voltage to indicate operation of said vehicle in either 2-wheel or 4-wheel drive.

7. Apparatus as defined in claim 1 wherein said compression spring disposed between said drive nut and said plunger urges said splined ring toward engagement with said differential output shaft at all times during selection of 4-wheel drive operation until alignment of splines of said ring and said output shaft permits full engagement therebetween.

8. Apparatus as defined in claim 1, wherein said plunger, said compression spring, and said drive nut are in a gear oil environment in said housing of said differential drive system, an O-ring oil seal being provided about said lead screw, whereby said motor, said gear trains, and elements of said means for energizing said motor are isolated from said gear oil.

* * * * *